United States Patent [19]
Mobin

[11] Patent Number: 5,872,801
[45] Date of Patent: Feb. 16, 1999

[54] METHOD OF COMPENSATING FOR DOPPLER ERROR IN A WIRELESS COMMUNICATIONS SYSTEM, SUCH AS FOR GSM AND IS54

[75] Inventor: Mohammad Shafiul Mobin, Whitehall, Pa.

[73] Assignee: Lucent Technologies Inc., Murray Hill, N.J.

[21] Appl. No.: 780,947

[22] Filed: Jan. 10, 1997

Related U.S. Application Data

[62] Division of Ser. No. 401,058, Mar. 8, 1995, Pat. No. 5,729,558.

[51] Int. Cl.$^6$ ..................................................... G06F 11/10
[52] U.S. Cl. ................................ 371/43; 371/44; 375/94
[58] Field of Search ................................ 371/43, 44, 45, 371/39.1; 375/11, 38, 94, 42, 95, 96, 228, 340

[56] References Cited

U.S. PATENT DOCUMENTS

| | | |
|---|---|---|
| 5,375,129 | 12/1994 | Cooper ........................................ 371/43 |
| 5,432,803 | 7/1995 | Liu et al. .................................... 371/43 |
| 5,502,735 | 3/1996 | Cooper ........................................ 371/43 |
| 5,729,558 | 3/1998 | Mobin ......................................... 371/43 |

*Primary Examiner*—Reba I. Elmore
*Assistant Examiner*—Thomas E. Brown
*Attorney, Agent, or Firm*—Anthony Grillo

[57] ABSTRACT

Briefly, in accordance with one embodiment of the invention, a method of compensating for Doppler error in a wireless communications system employing Viterbi decoding comprises the steps of: for each signal sample in a first predetermined-sized grouping of received signal samples, performing a parallel Viterbi update and short symbol decode; and for a second predetermined-sized grouping, forming by pipeline processing an estimate of the Doppler error in accordance with the parallel short traceback decoding performed for the first grouping, and adjusting each signal sample in the second grouping in accordance with the estimated Doppler error.

Briefly, in accordance with another embodiment of the invention, a Viterbi traceback reconstructed signal sample index comprises: a state counter, a traceback shift register (TBSR); a signal reconstruction table; and a comparator coupled in a configuration so as to provide the sign bit to the TBSR from a comparison of binary digital signals. The state counter is coupled so as to provide digital signals to the TBSR and the TBSR is coupled so as to provide digital signals to the signal reconstruction table.

4 Claims, 6 Drawing Sheets

FIG. 3

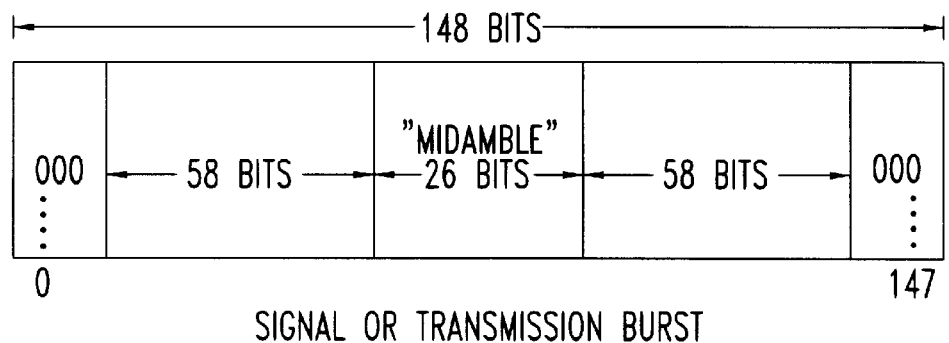

SIGNAL OR TRANSMISSION BURST

FIG. 5

INITIALIZATION $\Delta \text{SUM} = 0$
$\text{COUNT} = 0$
$n = 0$
$\theta(o) = o$

| PARALLEL VITERBI OPERATION | PIPELINED DOPPLER CALCULATIONS AND SIGNAL CORRECTIONS |
|---|---|
| 1 | $\Delta\theta = \tan^{-1} \Delta Q/\Delta I$ |
| 2 | $\Delta \text{sum} = \Delta \text{sum} + \Delta\theta$<br>$\text{count} = \text{count} + 1$<br>$\Delta_{AV} = \Delta \text{sum}/\text{count}$ |
| 3 | $\theta(n+1) = \theta(n) + \mu \Delta_{AV}$<br>$\mu = 0.3$ |
| 4 | $\phi_1 = \sin \theta(n+1)$<br>$\phi_2 = \cos \theta(n+1)$ |
| 5 | $I' = I\phi_2 + Q\phi_1$<br>$Q' = Q\phi_2 - I\phi_1$ |

FIG. 7

INITIALIZATION

BURST_COUNT = 0
PHASE_OFFSET = 0

AFTER COMPLETING A SIGNAL BURST

BURST_COUNT = BURST_COUNT + 1
PHASE_OFFSET = PHASE_OFFSET + $\theta_F(N) - \theta_B(N)$
IF (BURST_COUNT = K), THEN:

$$\begin{cases} \text{AFC} = \text{AFC} + \text{PHASE\_OFFSET}/K \\ \text{BURST\_COUNT} = 0 \\ \text{PHASE\_OFFSET} = 0 \end{cases}$$

FIG. 8

PARALLEL VITERBI OPERATIONS

| | 1 | 2 | 3 | 4 | 5 |
|---|---|---|---|---|---|
| DSP: 87 | Δθ / ΔIacc ΔQacc XXX | | | | |
| VITERBI: | UPDATE AND TRACEBACK | | | | |
| 88 | DSP: VITERBI: | ΔSUM, COUNT, ΔAV / ΔIacc ΔQacc XXX UPDATE AND TRACEBACK | | | |
| 89 | | | DSP: VITERBI: ΔIacc ΔQacc XXX | | |
| 90 | | | θ(n+1) / UPDATE AND TRACEBACK | DSP: VITERBI: ΔIacc ΔQacc XXX | |
| 91 | | | | SIN θ(n+1) COS θ(n+1) / UPDATE AND TRACEBACK | DSP: VITERBI: ΔIacc ΔQacc XXX |
| DSP: 92 | Δθ / ΔIacc ΔQacc XXX | | | | DOPPLER CORRECTION 92-96 / UPDATE AND TRACEBACK |
| VITERBI: | UPDATE AND TRACEBACK | | | | |

METHOD OF COMPENSATING FOR DOPPLER ERROR IN A WIRELESS COMMUNICATIONS SYSTEM, SUCH AS FOR GSM AND IS54

This is a division of application Ser. No. 08/401058 filed Mar. 8, 1995 now U.S. Pat. No. 5,729,558.

CROSS-REFERENCE TO RELATED APPLICATIONS

This patent application is related to concurrently filed patent application Ser. No. 08/471213, entitled "Method Of Performing Signal Reconstruction At The Receiving End Of A Communications System," (Mobin 20) by M. S. Mobin, filed Jun. 6, 1995; co-pending patent application Ser. No. 08/357003, entitled "Oscillator Frequency Offset Error Estimator For A Wireless Communications System, Such As For Use With GSM," (Mobin 14) by M. S. Mobin, filed Dec. 16 1994; co-pending patent application Ser. No. 08/356998, entitled "Coarse Frequency Burst Detector For A Wireless Communications System, Such as For Use With GSM," (Mobin 15) by M. S. Mobin, filed Dec. 16, 1994; co-pending patent application Ser. No. 08/357804, entitled "Coarse Frequency Burst Detector For A Wireline Communications System," (Mobin 16) by M. S. Mobin, filed Dec. 16, 1994; co-pending patent application Ser. No. 08/357802, entitled "Oscillator Frequency Offset Error Estimator For A Wireline Communications System," (Mobin 17) by M. S. Mobin, filed Dec. 16, 1994; co-pending patent application Ser. No. 08/153334, entitled "Efficient Utilization Of Present State/Next State Registers," filed Nov. 16, 1993, by D. Blaker, M. Diamondstein, G. Ellard, M. Mobin and H. Sam, (Blaker 3-2-3-3-4-10); co-pending patent application Ser. No. 08/152531, entitled "Variable Length Tracebacks," filed Nov. 16, 1993, by D. Blaker, G. Ellard, and M. Mobin, (Blaker 444); co-pending patent application Ser. No. 08/153333, entitled "Power And Time Saving Initial Tracebacks," filed Nov. 16, 1993, by D. Blaker, G. Ellard, and M. Mobin, (Blaker 6-6-6); co-pending application Ser. No. 08/152805, entitled "Digital Receiver With Minimum Cost Index Register," filed Nov. 16, 1993, by D. Blaker, G. Ellard, M. Mobin and H. Sam, (Blaker 2-2-23); co-pending application Ser. No. 08/153405, entitled "Digital Processor And Viterbi Decoder Having Shared Memory," filed Nov. 16, 1993, by M. Diamondstein, H. Sam and M. Thierbach, (Diamondstein 1-2-8); co-pending application Ser. No. 08/153391, entitled "Digital Signal Processor," filed Nov. 16, 1993, by D. Blaker, G. Ellard and M. Mobin, (Blaker 1-1-1); co-pending application Ser. No. 08/152807, entitled "Digital Signal Processor," filed Nov. 16, 1993, by D. Blaker, G. Ellard, M. Thierbach, and M. Mobin, (Blaker 5-5-5-9); and co-pending application Ser. No. 08/208156, entitled "Soft Symbol Decoding," filed Mar. 8, 1994, by D. Blaker, G. Ellard, and M. Mobin, (Blaker 8-8-8), all of the foregoing assigned to the assignee of the present invention and herein incorporated by reference.

TECHNICAL FIELD

The present invention relates to communications and, more particularly, to wireless communications systems.

BACKGROUND OF THE INVENTION

Several standards are being employed with respect to signaling standards for digital cellular telephony worldwide. One such standard is Europe's global system for mobile communications (GSM), described, for example, in the ETSI/GSM Specifications. Likewise, another standard, employed in the United States, is IS54. These signaling standards are typically intricate. Typically, a signal burst is transmitted via a wireless medium comprising a plurality of differentially encoded symbols, such as bits or binary digital signals. The encoded symbols are typically transmitted using phase shift keying in the baseband, such as, for example, minimum phase shift keying (MSK). This baseband signal form of the signal burst is typically then transmitted via a wireless medium using a radio frequency (RF) carrier.

In wireless communications, such as digital cellular telephony, transmission and reception typically occurs between stations, at least one of which is in motion. Furthermore, the velocity of the mobile station may change over time. As is well-known, such relative motion between transmitting and receiving stations, such as between a mobile station and a base station, may result in a Doppler shift of the frequency of the signal being transmitted. This Doppler shift may therefore result in a phase or frequency error in the received signal. Because of such a Doppler shift, the integrity of the signal being transmitted may be corrupted at the receiving end of the communications system.

Although various processes for compensating for such errors due to a Doppler shift are known, one problem associated with conventional approaches is the impact upon available signal processing resources at the receiving station. Typically, a receiving station, such as a mobile station, has limited signal processing capability. Therefore, exhaustive approaches to performing Doppler calculations and signal correction may exceed or at least bottleneck available resources when such resources are needed to continually process additional signals. A need therefore exists for a method of compensating for Doppler error while reducing associated bottlenecks for the available signal processing resources of a receiving station.

SUMMARY OF THE INVENTION

Briefly, in accordance with one embodiment of the invention, a method of compensating for Doppler error in a wireless communications system employing Viterbi decoding comprises the steps of: for each signal sample in a first predetermined-sized grouping of received signal samples, performing a parallel Viterbi update and short symbol decode; and for a second predetermined-sized grouping, forming by pipeline processing an estimate of the Doppler error in accordance with the parallel short traceback decoding performed for the first grouping and adjusting each signal sample in the second grouping in accordance with the estimated Doppler error.

Briefly, in accordance with another embodiment of the invention, a Viterbi traceback reconstructed signal sample index comprises: a state counter, a traceback shift register (TBSR); a signal reconstruction table; and a comparator coupled in a configuration so as to provide the sign bit from a comparison of binary digital signals to the TBSR. The state counter is coupled so as to provide digital signals to the TBSR and the TBSR is coupled so as to provide digital signals to the signal reconstruction table.

BRIEF DESCRIPTION OF THE DRAWINGS

The subject matter regarded as the invention is particularly pointed out and distinctly claimed in the concluding portion of the specification. The invention, however, both as to organization and method of operation, together with features, objects, and advantages thereof may best be understood by reference to the following detailed description when read with the accompanying drawings in which:

FIG. 3 is a schematic diagram illustration one embodiment of a signal burst or transmission burst, such as for GSM.

FIG. 5 is a table illustrating calculations that may be performed by an embodiment of a method of compensating for Doppler error in a wireless communications system in accordance with the invention.

FIG. 7 is a table illustrating automatic frequency correction (AFC) calculations that may be performed by an embodiment of a method of compensating for Doppler error in a wireless communications system in accordance with the invention.

FIG. 8 is a table illustrating a sequence of Viterbi operations in parallel with pipelined digital signal processor (DSP) operations that may be performed by an embodiment of a method of compensating for Doppler error in a wireless communications system in accordance with the invention.

DETAILED DESCRIPTION

Figure 1:
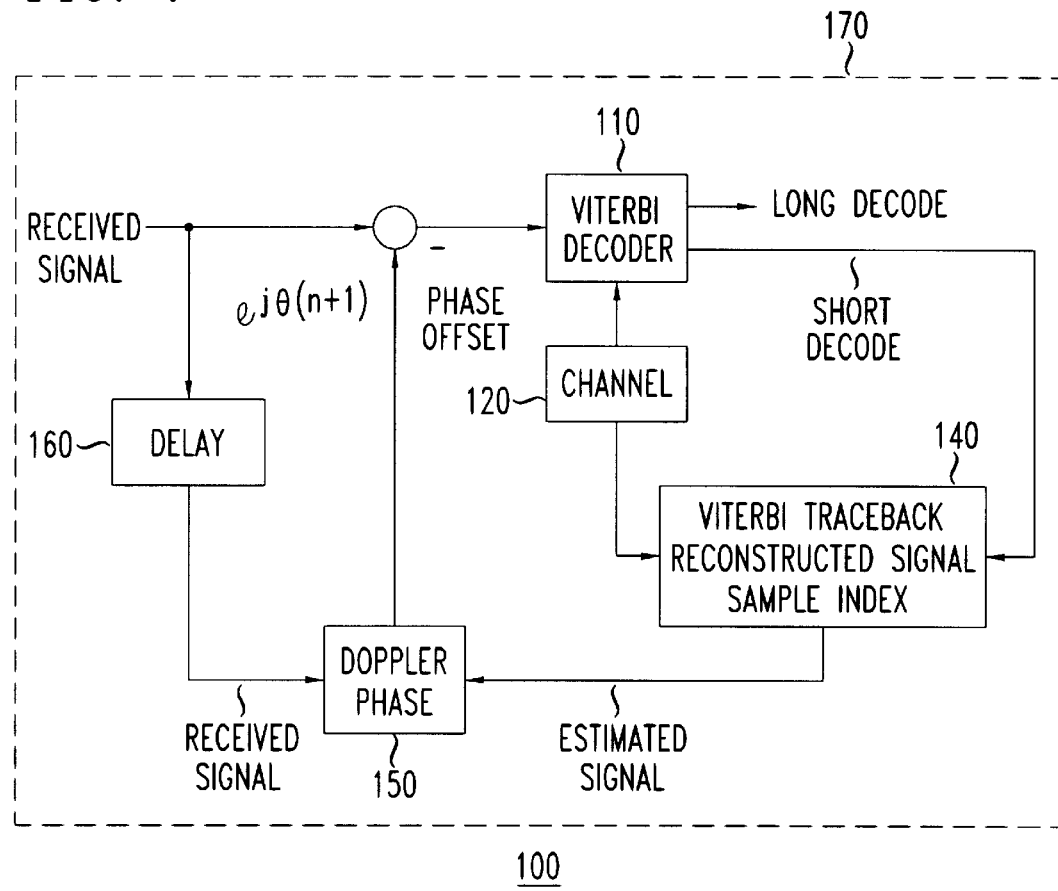
FIG. 1 is a schematic diagram of one embodiment of a system employing a method of compensating for Doppler error in a wireless communications system in accordance with the invention.

FIG. 3 illustrates a signal burst or transmission burst, such as may be employed in a wireless communications system, although the invention is not limited in scope to a signal burst having this particular format or structure. As illustrated in FIG. 3, the signal burst or transmission burst illustrated comprises a predetermined number of binary digital signals or bits. In this particular embodiment, each frame includes, in succession, a series of successive predetermined starting bits, a predetermined number of successive binary digital signals to be transmitted, a series of successive predetermined training bits, a second predetermined number of successive binary digital signals to be transmitted, and a series of successive predetermined ending bits. For GSM, for example, there are three starting and three ending bits, 58 bits in both portions of the signal burst comprising binary digital signals to be transmitted, and 26 training bits, referred to in this context as the "midamble," for a total of 148 bits per frame or signal burst. Of course, the invention is not restricted in scope to GSM.

As is well-known, GSM uses a form of signal modulation in the baseband known as Gaussian Minimum Phase Shift Keying (GMSK). GMSK is described in more detail in Digital Phase Modulation, by J. B. Anderson, T. Aulin and C. E. Sundburg, 1986, available from Plenum, although, of course, the invention is not restricted in scope to GMSK or even to MSK. For example, in IS54, an alternate baseband modulation scheme is employed. In such baseband modulation schemes, such as MSK or GMSK, the bit or binary digital signal stream to be transmitted, such as a signal burst, is differentially encoded, e.g., baseband modulated to produce a positive or negative phase shift representing one or more binary digital signals in the signal burst being transmitted. As previously described, this phase shift modulated baseband signal may then be applied to a radio frequency (RF) carrier for transmission via a wireless medium. Therefore, at the receiving end of the communications system, after downconversion and signal sampling, the binary digital signals in the signal burst being transmitted may be obtained by (1) a process, referred to as "derotation" in this context, applied to each signal sample in the signal burst and (2) then passing the derotated signal sample through a minimum least squares error (MLSE) equalizer. In this context, the term "differential encoded digital symbol" refers to a complex signal or signal sample at the receiving end of the communications system. The binary digital signals to be sent are transmitted as an analog signal via the modulation scheme employed in the baseband. The analog signal is then sampled at the receiving end in the baseband to provide the complex signal or signal sample. Depending on the modulation scheme employed, a symbol to be transmitted may comprise a predetermined set of one or more binary digital signals or bits. Furthermore, regarding "derotation," for GMSK, for example, a rotation of 90° may be applied to each differentially encoded symbol or signal sample in the signal burst transmitted via the wireless medium, such as by signal multiplication in the baseband of each differentially encoded symbol or signal sample by $$e^{\pm j\frac{\pi}{2}k},$$

where k=0, 1, 2, 3. . . . Of course, the invention is not restricted in scope to a signaling scheme employing a particular direction of rotation or derotation. The direction will depend, at least in part, on the particular signal modulation scheme employed. Likewise, the phase shift applied to "derotate" the baseband signal will depend on the modulation scheme employed. Nonetheless, as previously indicated, the Doppler effect due to the relative motion between the transmitting and receiving station, such as between a mobile station and a base station, may result in phase rotation error in the received signal in comparison with the signal transmitted. This is illustrated schematically in the Inphase-Quadrature (I-Q) plane in FIG. 2.

Figure 2:
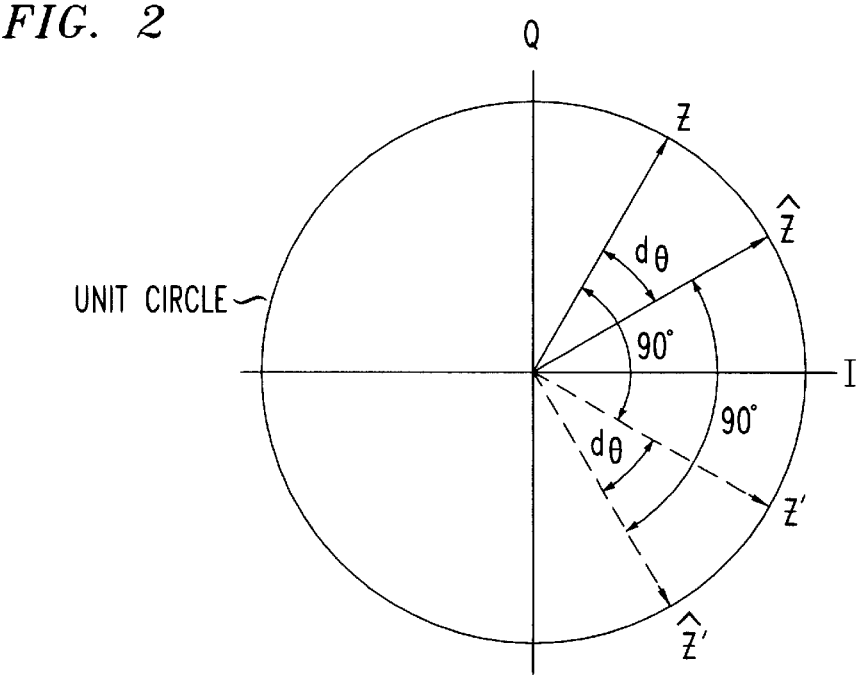
FIG. 2 is plot of complex signals in the Inphase-Quadrature (I-Q) plane illustrating a phase offset that may be attributable to, for example, Doppler error.

As illustrated, a Doppler shift may result in a frequency error in the received signal that may translate into a phase offset error in the complex signal obtained at the receiving end of the communications system. This offset error may also appear in the derotated signal obtained as well. In FIG. 2, the phase offset error is denoted by the phase difference, dθ, between Z and Ẑ. Z denotes the actual signal transmitted including a Doppler phase shift error and Ẑ denotes the Doppler corrected received signal. Likewise, Z' and Ẑ' denote these respective signals after derotation in the I-Q plane.

Various approachs to compensating the received signals for this phase offset error are known, such as described in "Two Stage Doppler Phase Corrected TCM/DMPSK for Shadowed Mobile Satellite Channels," by P. J. Mehane, appearing in *IEEE Trans. on Communications*, vol. 41, No. 8, August 1993, herein incorporated by reference. However, as previously indicated, such approachs are time-consuming and may also "bottleneck" significant signal processing capability in an environment having limited resources. A method of compensating for Doppler error in a wireless communications system in accordance with the invention to reduce such bottlenecks involves parallel and pipelined signal processing utilizing the computational resources available, such as, for example, a digital signal processor (DSP). For a method of compensating for Doppler error in a wireless communications system in accordance with the invention, portions of the signal processing to be performed may be segmented and "offloaded" to another processor or coprocessor. These segmented portions of the signal processing may be performed in advance by the coprocessor in a parallel fashion while the digital signal processor is also performing pipelined signal processing substantially in tandem. In this context, the term "pipelining" or "pipelined signal processing" refers to signal processing performed in a predetermined number of separate segments or stages. In such "pipelined signal processing," the processing result of a particular stage or segment is employed in the processing performed by the next stage or segment after the particular stage. The details of this approach will become clear in the discussion that follows.

This approach may be illustrated at least in part by the block diagram in FIG. 1. In this particular embodiment, a digital signal processor (DSP) 170 has embedded within it a Viterbi decoder 110. An example of such a digital signal processor is the DSP1618 available from AT&T Corp., which includes an embedded error correction coprocessor (ECCP) operating as Viterbi decoder 110, described in the preliminary data sheet, dated February 1994, available from AT&T Corp., herein incorporated by reference, although the scope of the invention is not limited in this respect. As illustrated, DSP 170 obtains the received signal burst. It will, of course, be appreciated that some preprocessing has typically been performed on the signal burst, such as downconversion, analog-to-digital conversion, and "derotation." Thus, each symbol in the received signal burst takes the form of a complex digital signal in the Inphase-Quadrature (I-Q) plane that itself represents one or more binary digital signals being transmitted, as previously described.

As illustrated, and as is well-known, the signal burst may be applied to a Viterbi decoder, such as Viterbi decoder 110, one signal sample at a time in order to obtain the transmitted signal burst based on the received signal burst. Viterbi decoding is well-known and described in, for example, *Digital Communications*, by E. Lee and D. Messerschmitt, available from Kluwer Academic Publishers, 1992, *Digital Communications by Satellite*, by Bhargava, Haccoun, Matyas, and Nuspl, available from John Wiley & Sons, Inc., 1981, and *Digital Communications by Satellite*, by J. J. Spilker, Jr., available from Prentice-Hall, Inc., 1977, all of which are herein incorporated by reference. Viterbi decoding is likewise described in "Maximum Likelihood Sequence Detection in the Presence of Intersymbol Interference," by G. D. Forney, Jr., and available in *IEEE Trans. on Information Theory*, IT-18(3): 363–378, May, 1972, and "The Viterbi Algorithm," *IEEE Proceedings*, March, 1973, 268–278, herein incorporated by reference. As illustrated in FIG. 1, however, prior to being applied to Viterbi decoder 110, each signal sample is adjusted by a phase offset provided by Doppler phase 150. Likewise, as illustrated in FIG. 1, this phase offset is obtained by Doppler phase 150 based on a prior predetermined-sized grouping of signal samples of the received signal burst that has been delayed by time delay 160 and compared with a signal estimate of the symbols transmitted for that prior grouping provided by Viterbi traceback reconstructed signal sample index 140. Delay 160 is introduced to ensure that the appropriate grouping of received signal samples is compared with the appropriate signal sample estimates. Channel estimate 120 provides signals to signal sample index 140 so that signal reconstruction may be performed. Signal reconstruction may be performed in accordance with the method described in aforementioned concurrently filed patent application Ser. No. 08/471,213 entitled "Method Of Performing Signal Reconstruction At The Receiving End of A Communications System," (Mobin 20), although the invention is not limited in scope in this respect. Signal sample index 140 obtains signals from Viterbi decoder 110 based on a process performed by the decoder designated in FIG. 1 as a "short traceback" or "short decode." In this particular embodiment, a short traceback refers to a traceback of length one, although short tracebacks of length greater than one may also be employed, such as described, for example, in aforementioned patent application Ser. No. 08/152531, entitled "Variable Length Tracebacks." Likewise, as illustrated in FIG. 1, Viterbi decoder also provides signals based on a process referred to as a "long traceback" or "long decode." Thus, Viterbi decoder 110 has the capability to decode the received signal burst in order to determine the binary digital signals that have been transmitted. However, a Viterbi decoder for this embodiment of a method of compensating for Doppler error in a wireless communications system has the ability to perform at least two processes, one referred to as a "long traceback" and another referred to as a "short traceback."

One aspect of a method of compensating for Doppler error in a wireless communications system is a parallel and pipelined processing approach between Viterbi decoder 110 and DSP 170 to reduce bottlenecks that DSP 170 might typically encounter during signal processing. More specifically, and as described in more detail hereinafter, in processing a signal burst, such as illustrated in FIG. 3, for example, for a predetermined-sized grouping of the received differentially encoded symbols, referred to in this context as an intermediate grouping, in this particular embodiment each signal sample is provided to Viterbi decoder 110 in order to perform a Viterbi update and short traceback. Furthermore, in parallel with that process, for the immediately succeeding grouping of complex signal samples in the signal burst, referred to in this context as the second grouping, digital signal processor 170 forms by pipelined processing an estimate of the Doppler error in accordance with the short traceback previously performed for each signal sample in the grouping preceding the grouping currently being applied to the Viterbi decoder, referred to in this context as the first grouping. Likewise, the digital signal processor will adjust or correct each complex signal sample in the succeeding or second grouping in accordance with the estimated Doppler error. This is illustrated in FIG. 1, for example, in which a phase offset is applied to the received signal corresponding to the complex signals or signal samples previously described before the signal samples are applied to the Viterbi decoder. Thus, for this particular embodiment, at a given time, an intermediate grouping may be processed by the Viterbi decoder, a first grouping just processed by the Viterbi decoder may be processed by the DSP to estimate Doppler error and a second grouping about to be applied to the Viterbi decoder may be adjusted based on the Doppler error estimated from processing the first grouping. In this fashion, in this particular embodiment, the digital signal processor typically does not experience a bottleneck because processing by the digital signal processor continually processes in a pipelined fashion complex signal samples based on complex signal samples previously processed in parallel by the Viterbi decoder, while the Viterbi decoder in parallel continually processes additional complex signal samples that have been previously adjusted in phase by the DSP.

In a method of compensating for Doppler error in a wireless communications system in accordance with the invention, processing is applied to the received signal burst in advance of the pipelining previously described. For example, as previously indicated, the received burst signal is downconverted to provide a baseband signal and the baseband signal typically is converted from an analog signal to a complex signal in a quartized binary form, although the scope of the invention is not limited in this respect. This quartized binary digital signal represents a complex signal in the inphase-quadrature (I-Q) plane corresponding to one symbol of a plurality of differentially encoded symbols for a signal burst. Thus, the received signal burst comprises a plurality of complex signals or signal samples transmitted via a wireless communications system and may be provided to a processor, such as digital signal processor 170, in the signal form just described. As previously indicated, the transmitted signal burst has a substantially predetermined structure in which a subset of the binary digital signals being transmitted are known at the receiving end of the wireless communications system. As is well-known, this signal information may be employed to obtain an estimate of the communications channel and this channel estimate may then be used in further signal processing. In order to obtain this channel estimate, the received complex signal samples for the encoded symbols in the signal burst may first be "derotated" and, likewise, an automatic frequency correction (AFC), such as described, for example, in aforementioned patent application serial no. 08/357003, may be applied to compensate, for example, for frequency offset error attributable to the oscillator employed to downconvert the transmitted signal to a baseband signal, although the scope of the invention is not limited in this respect.

Channel estimation is well-known, such as described in "Design and Performance of Synchronization Techniques and Viterbi Adaptive Equalizers for Narrowband TDMA Mobile Radio," by G. D'Aria and V. Zingarelli, published in *Nordic Seminar on Digital Land Mobile Radio Communication,* 3rd Proceeding, Sep. 12–15th, 1988, Copenhagen, herein incorporated by reference. and a variety of signal processing techniques, such as digital signal processing, may be employed. Typically, the training bits in the signal burst being transmitted, may be employed to obtain an estimate of the communications channel. Likewise, "channel windowing" may be employed to determine the "maximum energy" portion of the signal and normalization and signal scaling may, likewise, be employed, although the invention is not limited in scope in this respect. Once channel estimation has been performed, as illustrated in FIG. 1, this channel estimate may be employed to perform signal reconstruction. One particular technique for signal reconstruction is described in concurrently filed patent application Ser. No. 08/471,213, entitled "Method Of Performing Signal Reconstruction At The Receiving End Of A Communications System," (Mobin 20) herein incorporated by reference, although the invention is not limited in scope in this respect. In signal reconstruction, the channel estimate is employed to obtain an estimate of the complex signal sample transmitted for each encoded symbol capable of being transmitted. This may be obtained, for example, from the dot product of the channel estimate with vectors corresponding to the Viterbi states for the particular modulation scheme employed.

In this particular embodiment of a method of compensating for Doppler error in a wireless communications system in accordance with the invention, signal reconstruction is based at least in part on the assumption that the complex signal samples obtained at the receiving end of the wireless communications system correspond to locally maximum likelihood symbols also determined at the receiving end of the communications system. Therefore, reconstructed signals may then be employed in signal sample index 140, in conjunction with signals obtained from a short traceback performed by Viterbi decoder 110, to obtain an estimated signal provided to Doppler phase 150 for the transmitted symbol. For a predetermined-sized grouping of signal samples in the signal burst, this estimated signal or signal sample for each symbol may be compared with the received signal sample for the symbol in order to obtain an estimate of the phase offset, as described in more detail hereinafter.

As illustrated in FIG. 3, for this particular embodiment the signal burst may be divided or segregated into starting bits, ending bits, training bits and the binary digital signals to be transmitted. As illustrated in FIG. 1, the received signal samples corresponding to symbols are adjusted prior to being applied to Viterbi decoder 110. Therefore, initialization of the signal adjustments to be applied is desirable. In this particular embodiment of a method of compensating for Doppler error in a wireless communications system in accordance with the invention, it is desirable to use the training bits in order to initialize the Doppler portion of the processing for a variety of reasons. For example, the binary digital signals transmitted are known for the training bit portion of the signal burst. Thus, initialization using this portion of the signal burst provides a relatively high degree of reliability in terms of estimating Doppler error.

Although the scope of the invention is not limited in this respect, typically in wireless communications systems employing Viterbi decoding, the signal burst processing is divided into a forward portion and a backward portion, referred to in this context as "forward equalization" and "backward equalization." For this particular embodiment, signal processing is first applied to the "forward" portion, ranging from bit positions 77 to 147 in the signal burst illustrated in FIG. 3, for example. In FIG. 3, as illustrated, the initial bit position is numbered 0 and the remaining bit positions increase consecutively. One skilled in the art will nonetheless appreciate extension of the approach to the "backward" portion of the signal burst, such as to bits positions 65 to 0.

Figure 4:
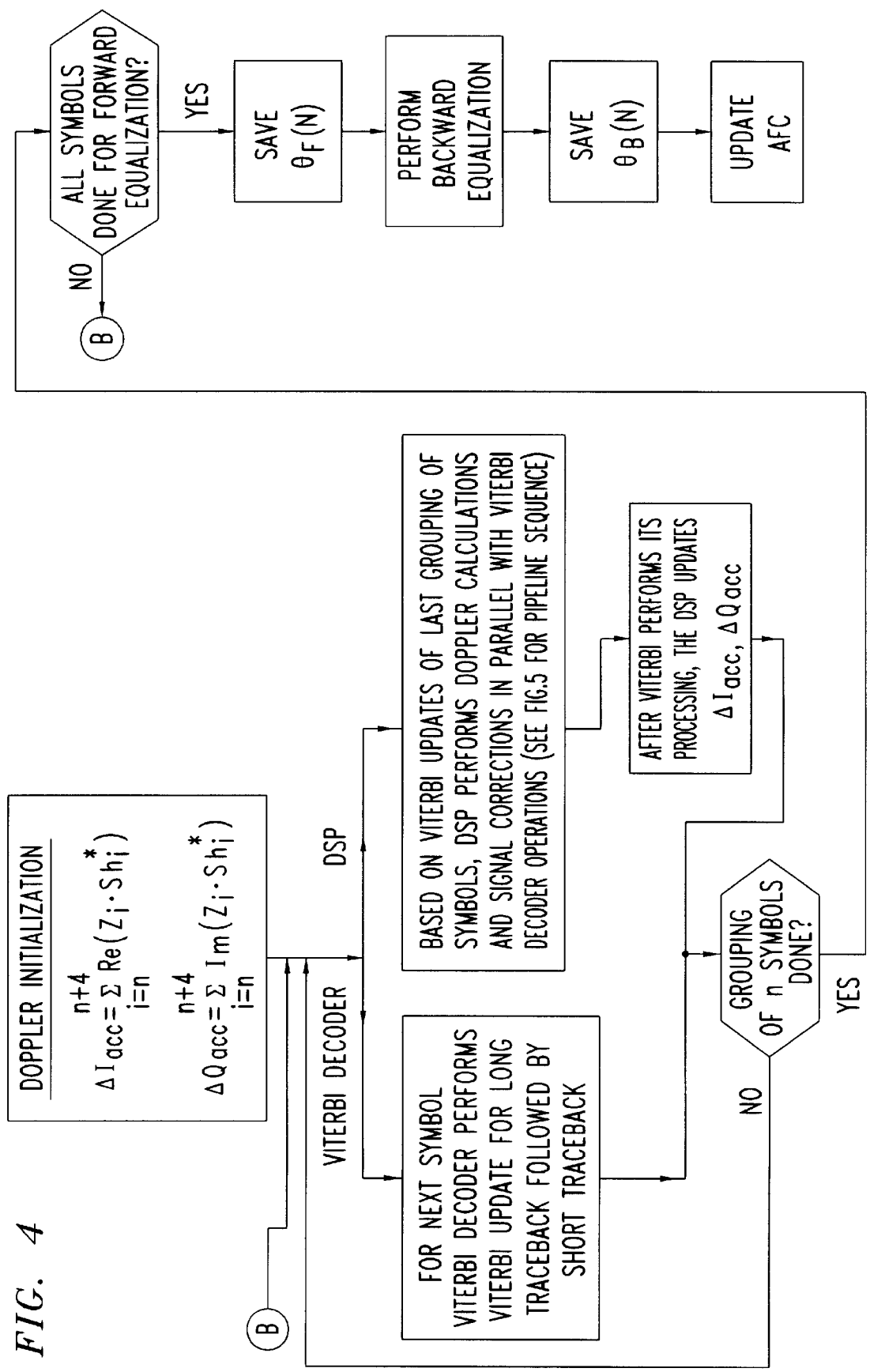
FIG. 4 is a flowchart illustrating one embodiment of a method of compensating for Doppler error in a wireless communications system in accordance with the invention.

FIG. 4 is a flowchart depicting the pipelined and parallel processing approach employed in this particular embodiment of a method of compensating for Doppler error in a wireless communications system in accordance with the invention. As illustrated in FIG. 4, it is assumed that "forward" equalization is performed first. Nonetheless, the invention is not restricted in scope in this respect and, alternatively, backward equalization may be performed first. Next, as illustrated in FIG. 4 and described below, $\Delta I_{ACC}$ and $\Delta Q_{ACC}$ are initialized using the training bits. As previously indicated, this is a useful aspect of a method of compensating for Doppler error in accordance with the invention in that initialization may be performed using transmitted binary digital signals that are known at the receiving end of the communications system.

In this particular embodiment, using the channel estimate previously obtained, the binary digital signals for positions 77–86 in the received signals burst are employed to obtain estimated signals or signal samples for the transmitted symbols and these estimated signal samples are compared with the signal samples actually received for these symbols to obtain the difference between respective inphase components and quadrature components of these compared signal samples. It is assumed in this context that the difference is largely attributable to Doppler error. Thus, the channel estimate is applied to known bit positions 77–82, 78–83, 79–84, 80–85, and 81–86 in the training bit portion of the signal burst. This provides 5 signal sample estimates corresponding to 5 successively transmitted symbols. These 5 signal sample estimates may now be compared with the complex signal samples received. The differences between the inphase components of the estimated and received complex signals are accumulated to obtain a $\Delta I_{ACC}$ estimate for this particular grouping of 5 signal samples. Likewise, a $\Delta Q_{ACC}$ estimate for this particular grouping is also obtained by accumulating the differences between the quadrature components, as illustrated in FIG. 4. This initialization approach is summarized by the first block in the flow chart shown in FIG. 4. In that block, $Z_i$ represents the received signal samples with Doppler phase offset, whereas $Sh_i^*$ represents the complex conjugate of the reconstructed signal sample based upon applying the channel estimate to the training bits, as just described. It will, of course, be appreciated that although in this particular embodiment a predetermined-sized grouping comprises 5 successive complex signal samples corresponding to successively transmitted symbols, the invention is not restricted in scope with this respect.

After bit position 86, the initialization portion has been completed and as illustrated in FIG. 4, a signal processing loop is employed in which Viterbi decoder 110 and DSP 170 in this particular embodiment perform signal processing in parallel so that a pipelined approach maybe employed for the signal processing performed by the DSP, as previously described. In particular in this embodiment, as illustrated in FIG. 4, DSP 170 employs $\Delta I_{ACC}$ and $\Delta Q_{ACC}$ obtained based on processing of the immediately preceding grouping of complex signals to perform Doppler calculations and, likewise, using these calculations, performs Doppler signal corrections of the complex signals in the succeeding grouping in the signal burst i.e., bit positions 92–96 in this particular example for this particular embodiment, before those signals are provided to the Viterbi decoder. At the same time, the Viterbi decoder is performing Viterbi updating and short traceback decoding for the grouping beginning with bit position 87 for this particular embodiment. This Viterbi updating and short traceback decoding is performed a symbol or signal sample at a time and after processing upon each signal sample, the results obtained by the Viterbi decoder are employed by DSP 170 to compute $\Delta I_{ACC}$ and $\Delta Q_{ACC}$ for the grouping being processed by Viterbi decoder 110 in this particular embodiment Likewise, in this particular embodiment, the Viterbi decoder performs a Viterbi update by performing a long traceback. The Viterbi decoder then performs a short traceback, of length one in this embodiment, as illustrated in FIG. 4. Likewise, once processing of this grouping by the Viterbi decoder is complete, then the DSP may be employed to perform the Doppler calculations and signal corrections for another grouping of signal samples based on the signal processing by the Viterbi decoder for this grouping while the Viterbi decoder is again performing Viterbi updates and short traceback decoding for the grouping of signals immediately after this grouping. Thus, it will now be appreciated by one skilled in the art that by employing this parallel processing structure, the Viterbi decoder continues to perform Viterbi updates and short traceback decodes while in parallel the DSP operates in a pipeline fashion to perform Doppler calculations and signal corrections for a grouping of signals based on the recently completed Viterbi processing of a prior grouping.

As illustrated in FIG. 4, eventually forward equalization is complete, in which case Doppler calculations and signal corrections are performed for the final grouping in the particular signal burst. Likewise, once this is complete, the process may be repeated for backward equalization. Ultimately, once the backward equalization is performed, the accumulated Doppler error from the backward equalization and the forward equalization may be combined to perform automatic frequency correction (AFC) for the next signal burst to be processed, as explained in more detail hereinafter. This AFC update is performed because the Doppler signal corrections may be employed to assist in tracking phase offset not easily corrected by employing other AFC techniques.

Various approaches to the Doppler calculations and signal corrections are possible and the invention is not restricted in scope to any particular approach. Likewise, the invention is not restricted in scope to a particular allocation of Doppler calculations or signal corrections to successive parallel Viterbi operations while processing signal samples in a particular grouping. Nonetheless, in this particular embodiment, 5 successive operations of Viterbi updating and short traceback decoding are employed in each grouping. On each parallel Viterbi operation, the DSP performs a different portion of the Doppler calculations and signal corrections. Likewise, in this embodiment, on each parallel operation, once the Viterbi update and short traceback decoding is performed, the DSP then recomputes the accumulated $\Delta I$ and $\Delta Q$, i.e., $\Delta I_{ACC}$ and $\Delta Q_{ACC}$, for the grouping being processed by the Viterbi decoder based on the short traceback decoding just performed by the decoder. For example, on the first Viterbi parallel operation, the DSP takes $\Delta I_{ACC}$ and $\Delta Q_{ACC}$ from the preceding grouping and obtains an estimate of the change in the phase offset from the inverse arctangent. Likewise, on the second parallel operation, the DSP obtains the average phase offset. This average is obtained from an accumulation of the phase offsets obtained for each grouping in the signal burst processed so far adjusted by the number of groupings processed. Likewise, on the third parallel operation, the accumulated phase offset is estimated based on the prior accumulated phase offset adjusted by a "weighting" function of the average differential phase offset. It will, of course, be appreciated that this weighting function may also be modified adaptively in alternative embodiments or omitted entirely. Likewise, on the fourth parallel operation, the sine and cosine of the estimated phase offset for this particular grouping is obtained. Finally, on the fifth parallel operation, Doppler signal corrections are made to the next grouping about to be processed by the Viterbi decoder, such as illustrated in FIG. 1. It will now be appreciated that this particular approach to pipelining the DSP with the Viterbi decoder processing in parallel introduces a slight lag in the Doppler signal corrections performed. It will be appreciated, however, that between successive groupings within a signal burst the impact of such a lag should not be significant. Furthermore, due to the successive nature of the parallel Viterbi operations, the effect of any slight lag should remain relatively fixed or stable over the signal burst. The previously described signal processing by parallel Viterbi operations is summarized by the table provided in FIG. 5.

After the Viterbi decoder has performed a Viterbi update and the short traceback for the next signal sample, such as indicated in FIG. 4, and as described in, for example, aforementioned patent application Ser. No. 08/152531, signals are provided to the DSP by the decoder so that ΔI and ΔQ may be obtained for the particular signal sample and then $\Delta I_{ACC}$ and $\Delta Q_{ACC}$ may be processed by the DSP. More particularly, once a short traceback is completed by the Viterbi decoder, an estimate of the complex signal transmitted is obtained using a Viterbi traceback reconstructed signal sample index in accordance with the invention, as described in more detail hereinafter, although the scope of a method of compensating for Doppler error in accordance with the invention is not limited in this respect. This estimate may then be provided to the DSP and the DSP may process the dot product of the complex conjugate of this signal sample estimate for the symbol with the actual signal sample for the symbol in order to obtain ΔI and ΔQ, although the scope of the invention is not limited in this respect. Likewise, ΔI and ΔQ for each of the signal samples obtained, as just described, may be accumulated so that once the final signal sample in a particular grouping is processed, $\Delta I_{ACC}$ and $\Delta Q_{ACC}$ may be obtained for that grouping. As previously indicated, a similar approach to processing $\Delta I_{ACC}$ and $\Delta Q_{ACC}$ may be employed in conjunction with the training bits for the purposes of initialization.

FIG. 8 is a table illustrating the sequence of parallel Viterbi operations that may be performed by an embodiment of a method of compensating for Doppler error in a wireless communication system in accordance with the invention previously described. The table in FIG. 8 illustrates the parallel Viterbi operations with the pipelined DSP processing for bit positions 87 to 92. As illustrated, this embodiment employs 5 parallel operations or operation cycles, although the invention is not limited in scope in this respect. Therefore, on the Viterbi operation performed by Viterbi decoder 110, in parallel the DSP performs a different portion of the Doppler calculations and signal corrections, as previously described and as illustrated in FIG. 8. An advantage of this pipelined parallel processing approach is that the utilization of the DSP and the Viterbi decoder is improved in comparison with alternate approaches. More particularly, less idle time occurs for the processor.

Although the invention is not restricted in scope to performing AFC or to this particular technique of AFC, in one embodiment, after a phase offset, θ(n), has been accumulated based upon forward equalization attributable to Doppler error, denoted in this context as $\theta_F(N)$ and, likewise, $\theta_B(N)$ has been accumulated based upon backward equalization, as illustrated in FIG. 4, these phase offsets may be employed to perform automatic frequency correction (AFC) for later signal bursts to be received. In this particular embodiment, as illustrated by the table shown in FIG. 7, the phase offset $[\theta_F(N) - \theta_B(N)]$ may be accumulated over a predetermined number of signal bursts and then employed to update the phase compensation employed to perform AFC.

As indicated previously, Viterbi decoding is well-known and employed in a variety of technologies, such as in wireless communications. As is well-known, one aspect of Viterbi decoding relates to performing Viterbi updates or trellis decoding using received signal samples at the receiving end of a communications system. As received signal samples are processed by the Viterbi decoder, a "survival metric" is obtained for each Viterbi state in accordance with a Viterbi add-compare-select operation. After a predetermined number of signal samples have been processed, symbol decoding is performed in a manner referred to as a "long traceback" or "long decode" that reflects the most likely set of symbols to have been transmitted based upon the accumulated metrics.

In some situations, however, it may be desirable to perform a process referred to as a "short traceback." In this situation, it may be desirable to form a local estimate of the likely symbol to have been transmitted based upon recently available signal information. Although this estimate may not be as good as the estimate based upon a "long decode" or "long traceback;" nonetheless, in some circumstances, it may be necessary or desirable to have an early estimate available for signal processing purposes before a long traceback may be performed. One example of this desirability is in the context of performing Doppler error calculations and signal corrections. Typically, in these situations, it may be desirable or important to obtain the results of a short traceback in a timely and efficient manner. Typically, performing a process referred to as "traceback packing" as part of the traceback is a cumbersome process including relatively significant processing complexity. In this context, "traceback packing" refers to the process by which binary digital signals or bits indicated by the Viterbi decoding process to have been transmitted are concatenated for signal processing purposes.

Figure 6:
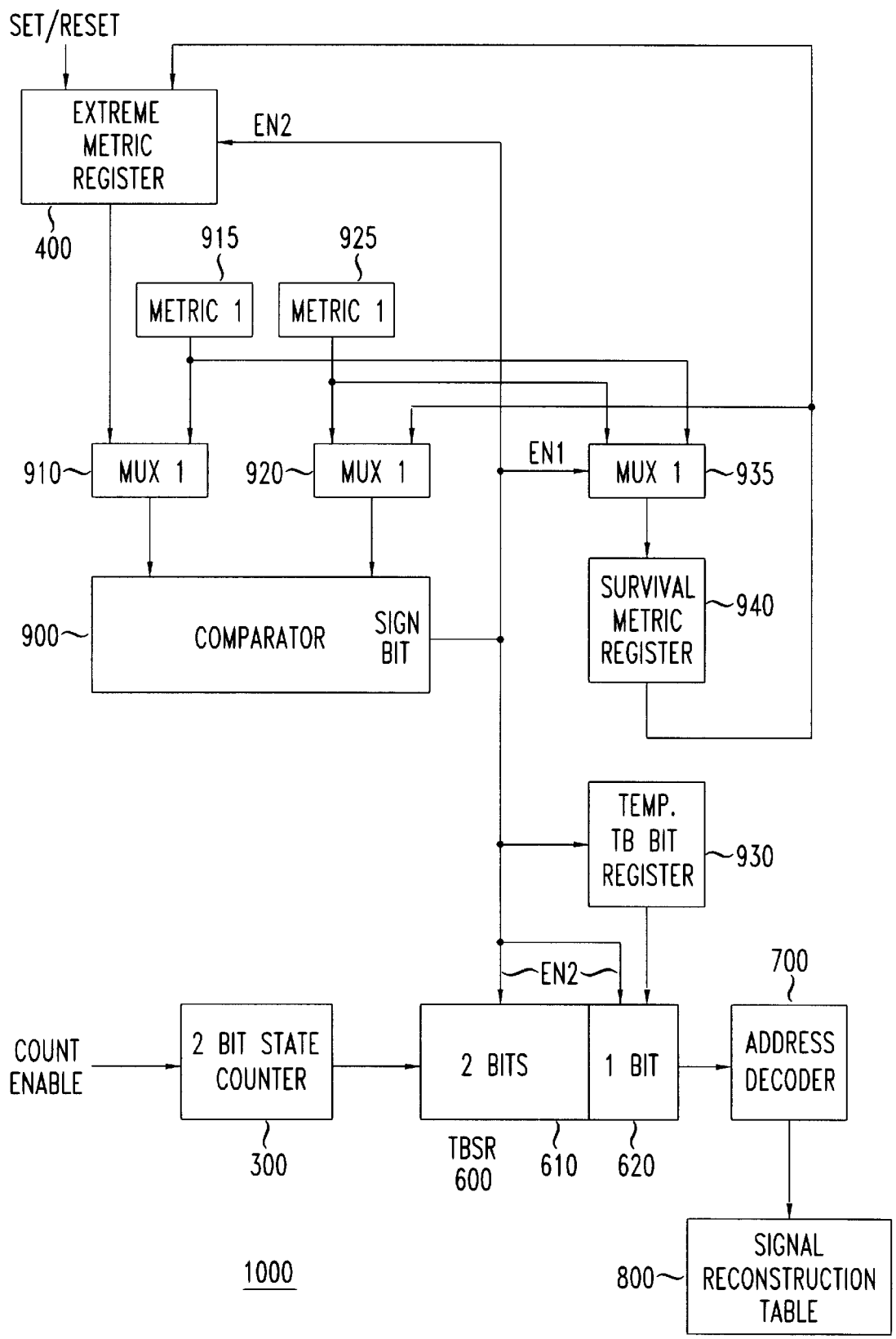
FIG. 6 is a block diagram illustrating an embodiment of a Viterbi traceback reconstructed signal sample index in accordance with the invention that may, for example, be employed by an embodiment of a method of compensation for Doppler error in a wireless communications system in accordance with the invention.

FIG. 6 is a schematic diagram of embodiment 1000 of a Viterbi traceback reconstructed signal sample index in accordance with the invention providing a relatively efficient technique for performing traceback packing, particularly for a short traceback. As illustrated in FIG. 1, embodiment 1000 includes a counter or state counter 300, a traceback shift register (TBSR) 600, a signal reconstruction table 800, and a comparator 900 coupled in a configuration so as to provide the sign bit to the TBSR from a comparison of binary digital signals performed by comparator 900. As illustrated in FIG. 6, state counter 300 is coupled so as to provide digital signals to TBSR 600. Furthermore, TBSR 600 is coupled so as to provide digital signals to signal reconstruction table 800, via address decoder 700 for the embodiment illustrated in FIG. 6.

Viterbi traceback reconstructed signal sample index 1000 is intended for use in conjunction with a Viterbi decoder. As is well-known, typically in Viterbi decoding, upon processing of another received signal sample, a Viterbi update is performed in which stored signals, referred to in this context as "metrics," are updated. Once this Viterbi update has been performed, the stored metrics may be provided to comparator 900, as illustrated in FIG. 6, in order to perform a short traceback in accordance with the invention.

As illustrated in FIG. 6, MUXes 910 and 920 respectively couple registers 915 and 925 to the respective input ports of comparator 900. Although not explicitly illustrated in FIG. 6, these MUXes may be coupled, for example, to Viterbi decoder 110 or a RAM coupled to decoder 110 so that the "metrics" processed by Viterbi decoder 110 are available for comparison by comparator 900. In accordance with the Viterbi decoding process, for a particular Viterbi state, two metrics are compared to determine the most extreme value metric for that particular Viterbi state. The extreme metric thereby obtained for that state may be stored for later comparison with the extreme metrics similarly obtained for the other Viterbi states. An embodiment of a Viterbi reconstructed signal samples index in accordance with the invention provides an efficient technique for performing this processing, as described in more detail hereinafter.

As illustrated in FIG. 6, state counter 300, in response to an externally-derived clock enable signal, may successively provide digital signals corresponding to the Viterbi states capable of being transmitted by the particular communications system. For example, in FIG. 6, four Viterbi states are illustrated using a two-bit counter, although the invention is not restricted in scope in this respect. As illustrated in FIG. 6, the counter provides these digital signals to TBSR 600. At substantially the same time, MUXes 910 and 920 provide two stored metrics to comparator 900 for the state indicated by counter 300, the stored metrics being derived from processing by Viterbi decoder 110. More particularly, in accordance with conventional Viterbi processing, these signals being compared represent the sum of a calculated branch metric and accumulated cost for the Viterbi state indicated by counter 300. Likewise, the sign bit obtained by comparator 900 based on the comparison of the two metrics is then stored in register 930. Depending on the extreme value of the metric obtained for this state, this sign bit may later be transferred to TBSR 600 as a "short traceback bit," as explained in more detail hereinafter.

As illustrated, the sign bit from this comparison also operates as enable signal EN1 to MUX 935. Signal ENI operates, via MUX 935, to transfer the one extreme signal of the two signals respectively stored in registers 915 and 925 to register 940. Thus, register 940 operates as a "survival metric" register. Now, the contents of register 940, via MUX 920, may be compared with the contents of register 400, which stores the current value of the extreme metric for the Viterbi states processed up to this point. Comparator 900 then compares the "survival metric" value for the current Viterbi state as indicated by state counter 300, stored in register 940, with the current extreme metric value for the previously processed Viterbi states, stored in register 400. Assuming the "survival metric" for the current state is more extreme, i.e., greater or smaller depending upon the particular embodiment, the sign bit from comparator 900, denoted in FIG. 6 as EN2, enables the contents of register 940 to be loaded into register 400. Likewise, the contents of counter 300, indicating the current Viterbi state, is loaded as a digital signal into the portion of TBSR 600 denoted 610 in FIG. 6. Likewise, the sign bit stored in register 930 is loaded into the portion of TBSR 600 denoted as 620 and becomes the "short traceback bit." It will, of course, be appreciated that this process is repeated for each Viterbi state indicated by state counter 300. Thus, if a more extreme metric is obtained later, the contents of register 400 is loaded with that extreme metric signal value and binary digital signals representing the corresponding Viterbi state and short traceback bit are loaded in TBSR 600. It should now be clear to one of ordinary skill in the art that once counter 300 has provided signals to TBSR 600 corresponding to all the Viterbi states capable of being transmitted for the communications system, register 400 should contain the signal value for the most extreme metric of the Viterbi states and, likewise, TBSR 600 should contain binary digital signals representing the particular Viterbi state corresponding to that metric signal value and the associated short traceback bit. As illustrated in FIG. 6, the contents of TBSR 600 may now be provided to a signal reconstruction table 800 with memory location addresses that correspond to the concatenation of the Viterbi states in the form of a binary digital signal with a short traceback bit. The contents of the memory locations of signal reconstruction table 800 may contain the reconstructed signal sample values corresponding to the associated Viterbi states including a short traceback bit, such as may be generated as described in aforementioned concurrently filed patent application Ser. No. 08/471213, entitled "Method Of Performing Signal Reconstruction At The Receiving End Of A Communications System," (Mobin 20) herein incorporated by reference. Likewise, alternatively, as illustrated in FIG. 6, address decoder 700 may translate or decode the binary digital signals provided by TBSR 600 into the memory location address corresponding to the particular reconstructed signal sample value.

One advantage of a TBSR in accordance with the invention, such as the embodiment illustrated in FIG. 6, is that it provides a means to efficiently address a table of reconstructed signal sample values. By comparing "metrics," as previously described, the TBSR ultimately contains a binary digital signal that represents the binary digital signal most likely to have been transmitted via the communications system based at least in part upon recently available signal information. Thus, this binary digital signal may now be employed to address a memory storing estimated signal samples, i.e., reconstructed signal samples, for the binary digital signals capable of being transmitted by the particular communications system. In this particular embodiment, a 2-bit Viterbi state is concatenated with one short traceback bit assuming, for example, a three tap communications channel estimate is employed, although the invention is, of course, not restricted in scope in this respect.

It will now be appreciated that a Viterbi traceback reconstructed signal sample index in accordance with the invention offers advantages of speed, power savings and efficiency in comparison with traditional Viterbi traceback packing approaches. The desired reconstructed signal sample value may be quickly and efficiently addressed using a TBSR in accordance with the invention, as previously described. It will also now be appreciated that, although the embodiment shown in FIG. 6 includes a comparator in which the extreme signal value of two binary digital signals, such as the smaller signal, is obtained, alternatively, this technique may be employed to find the larger of the two binary digital signals.

While only certain features of the invention have been illustrated and described herein; many modifications, substitutions, changes or equivalents will now occur to those skilled in the art. It is, therefore, to be understood that the appended claims are intended to cover all such modifications and changes as fall within the true spirit of the invention.

The invention claimed is:

1. A Viterbi traceback reconstructed signal sample index system comprising:

a state counter;

a traceback shift register (TBSR);

a signal reconstruction table; and a comparator coupled in a configuration so as to provide the sign bit to said TBSR from a comparison of binary digital signals;

said state counter being coupled so as to provide digital signals to said TBSR; and said TBSR being coupled so as to provide digital signals to said signal reconstruction table.

2. The Viterbi traceback reconstructed signal sample index system of claim 1, wherein said configuration includes a temporary traceback bit (TTB) register coupled to said comparator so as to receive said sign bit;

said TTB register being coupled to said TBSR.

3. The Viterbi traceback reconstructed signal sample index system of claim 2, wherein said configuration is adapted to load the contents of said state counter and said TTB register into said TBSR in response to an enabling signal provided by said comparator.

4. The Viterbi traceback reconstructed signal sample index system of claim 1, wherein said signal reconstruction table comprises a binary digital signal address decoder coupled to a memory;

a said memory including binary digital signals stored in memory locations addressed by said address decoder;

said stored binary digital signals comprising reconstructed signal samples corresponding to predetermined states provided as binary digital signals to said address decoder by said TBSR.

* * * * *